US012746688B2

(12) United States Patent
Tan et al.

(10) Patent No.: US 12,746,688 B2
(45) Date of Patent: Sep. 29, 2026

(54) SYSTEMS AND METHODS FOR GROUND ASSAULT PAYLOAD PLATFORM

(71) Applicant: Cushybots Corporation, Havertown, PA (US)

(72) Inventors: Allen Dodgson Tan, Long Beach, CA (US); John A. Wright, Phnom Penh (KH); Garrett M. Clayton, Havertown, PA (US)

(73) Assignee: Cushybots Corporation, Havertown, PA (US)

( * ) Notice: Subject to any disclaimer, the term of this patent is extended or adjusted under 35 U.S.C. 154(b) by 68 days.

(21) Appl. No.: 18/623,433

(22) Filed: Apr. 1, 2024

(65) Prior Publication Data

US 2024/0326257 A1 Oct. 3, 2024

Related U.S. Application Data

(60) Provisional application No. 63/455,841, filed on Mar. 30, 2023.

(51) Int. Cl.

*B25J 11/00* (2006.01)
*B25J 5/00* (2006.01)
*B25J 13/00* (2006.01)
*B25J 13/06* (2006.01)
*B25J 19/02* (2006.01)

(52) U.S. Cl.

CPC ........... *B25J 11/0025* (2013.01); *B25J 5/007* (2013.01); *B25J 13/006* (2013.01); *B25J 13/065* (2013.01); *B25J 19/023* (2013.01)

(58) Field of Classification Search

None

See application file for complete search history.

(56) References Cited

U.S. PATENT DOCUMENTS

| | | | | |
|---|---|---|---|---|
| 10,499,037 | B1 * | 12/2019 | Wilcox | H04N 23/57 |
| 2006/0050929 | A1 * | 3/2006 | Rast | F42B 5/035 382/103 |
| 2006/0197835 | A1 * | 9/2006 | Anderson | H04N 7/183 348/E7.087 |
| 2008/0121097 | A1 * | 5/2008 | Rudakevych | F42D 5/04 901/1 |
| 2008/0290222 | A1 * | 11/2008 | Aston | B64G 1/641 244/173.3 |
| 2009/0040307 | A1 * | 2/2009 | Rubin | G08B 13/19632 348/E7.085 |
| 2009/0287363 | A1 * | 11/2009 | Young | F41C 23/16 709/203 |
| 2016/0304217 | A1 * | 10/2016 | Fisher | B64F 1/222 |
| 2019/0066032 | A1 * | 2/2019 | Taveira | B64D 1/02 |
| 2019/0082015 | A1 * | 3/2019 | Husain | G01S 1/00 |
| 2022/0171599 | A1 * | 6/2022 | Krispin | G08B 5/004 |
| 2022/0177125 | A1 * | 6/2022 | Abdellatif | B64U 10/13 |

* cited by examiner

*Primary Examiner* — Daniel L Greene

(74) *Attorney, Agent, or Firm* — Armstrong Teasdale LLP

(57) ABSTRACT

A system, method, and apparatus comprising a robotic payload platform, an operator control module, a finger joystick controller, and a camera display. A single operator controls the robotic platform system to provide immediate-vicinity reconnaissance and payload delivery during ground assault operations. The robotic platform system is able to be secured to a tactical vest and engaged with minimal setup, deliver commonly available payloads with maximum flexibility, and traverse different terrains.

18 Claims, 15 Drawing Sheets

SYSTEMS AND METHODS FOR GROUND ASSAULT PAYLOAD PLATFORM

FIELD OF THE INVENTION

The present invention relates to a robotic system and associated software, and, more particularly, a robotic system to provide immediate vicinity reconnaissance and payload delivery.

BACKGROUND

Reconnaissance has long been an important aspect of military forces, operating to gather information concerning the activities, resources, or military forces of a foreign nation or armed group. Today, military operations use robotic vehicles both in the air and on the ground across different terrains. Although used by the United States military since 2004, unmanned ground vehicles need to continue to address the changing nature of combat and warfare. Generally, unmanned ground vehicles are robotic platforms that act as an extension of the human operator. These platforms can cross numerous types of terrain for the human operators while communicating by camera. Militaries use a wide variety of unmanned ground vehicles for a myriad of operations, including explosives employing and explosive disabling. However, because of the nature of warfare, robotic payload platforms need to be flexible in the types and kinds of payload the platform employs as well as be able to setup and deploy quickly.

What is needed is a ground-based robotic platform for use by individuals to provide immediate vicinity reconnaissance and payload delivery.

BRIEF SUMMARY OF THE INVENTION

Systems, methods, and apparatuses comprising a robotic platform to provide immediate vicinity reconnaissance and payload delivery are disclosed. A system in accordance with the present disclosure comprises a robotic payload platform, cable, miniature cable reel, operator control module, finger joystick controller, and mobile phone. An operator controls the robotic platform system to provide immediate-vicinity reconnaissance and payload delivery during ground assault operations. The robotic platform system can be secured to a tactical vest and engaged with minimal setup, deliver commonly available payloads with maximum flexibility, and traverse different terrains. Further, the payload delivery mechanism is fully safe when system is in no-power state. The robot operates on a 12 V system and can be charged from a car batter, solar panel array, or air conditioner. The control module has a small internal battery but can also be powered by a standard USB cellular phone power bank. The robotic platform may comprise an unmanned ground vehicle, an unmanned aerial device (e.g., a drone, including but not limited to a micro drone, a tactical drone, a combat drone, a reconnaissance drone, a GPS drone, and/or any other drone known in the art), a hovercraft, an underwater surveillance system, a robot of various shapes and sizes (e.g., a spherical robot), a smart vehicle, drone, and/or a radio-controlled vehicle. However, the foregoing lists are meant to be merely exemplary and not exhaustive.

The technical effect achieved by this system may be at least one of: (i) ability to deploy and control by an individual user while engaged in dynamic operational scenarios with minimal setup; (ii) ability to provide visual and audio reconnaissance capabilities; (iii) ability to deliver an assortment of commonly available payloads with maximum flexibility; (iv) ability to traverse challenging terrain, such as debris-contaminated built urban environments, forest floors, mud and trench systems, and other various environments; (v) no to minimal maintenance required; (vi) consumable, and therefore cost effective option; (vii) visual user interface (UI) delivered through a computing device, such as a mobile device; (viii) easy operation through a user control interface via small controller with physical buttons and control key functions; (ix) payload delivery mechanism is safe and secure when system is in no-power state; (x) low power requirement, thereby enabling the system to be powered by a car battery, a solar panel array, AC charger with an adapter, and the like; (xi) a control module with a small internal battery for limited operations with ability to be used for long periods of time by attaching a standard USB phone power bank; and (xii) user components which can be secured to a tactical vest or other wearable garment.

BRIEF DESCRIPTION OF THE DRAWINGS

This disclosure is illustrated by way of example and not by way of limitation in the accompanying figure(s). The figure(s) may, alone or in combination, illustrate one or more embodiments of the disclosure. Elements illustrated in the figure(s) are not necessarily drawn to scale. Reference labels may be repeated among the figures to indicate corresponding or analogous elements.

The detailed description makes reference to the accompanying figures in which.

DETAILED DESCRIPTION

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Figure 1:
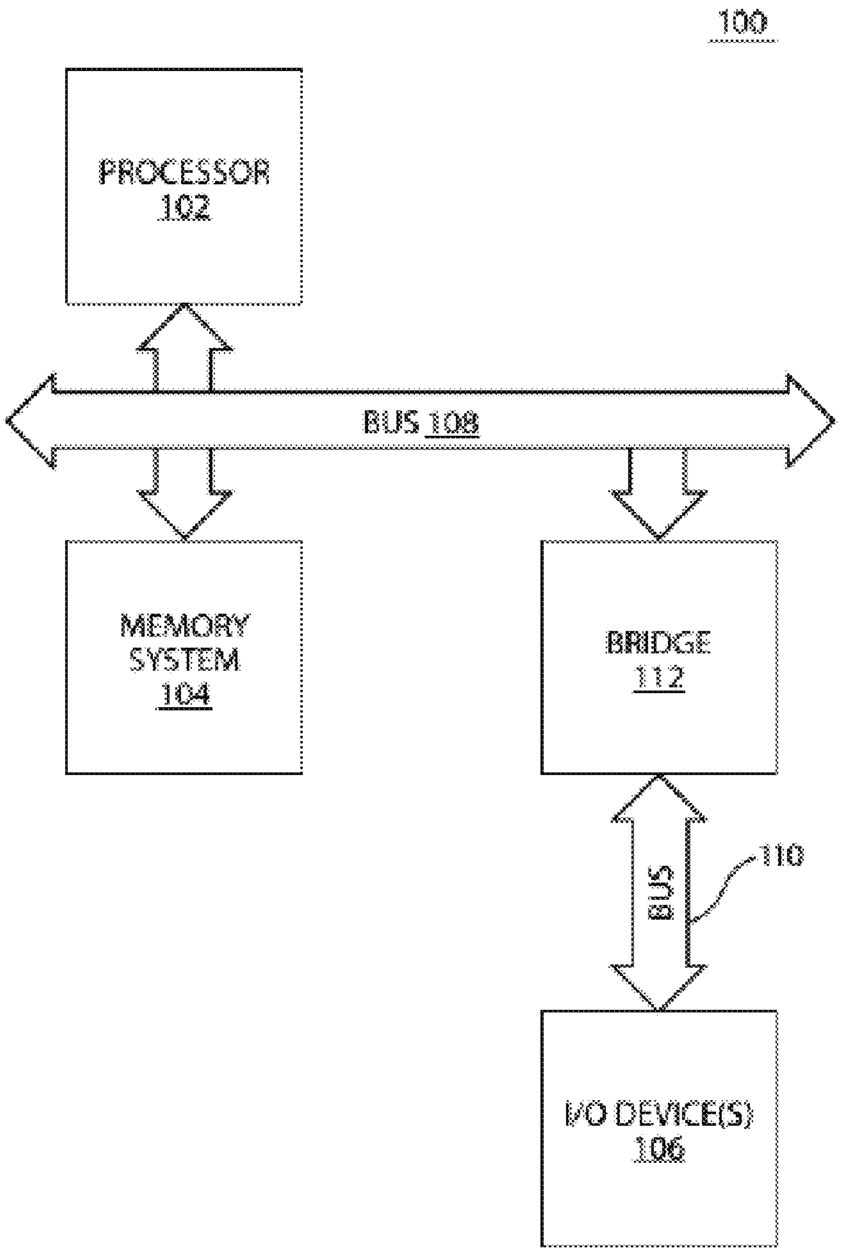
FIG. 1 is a simplified functional block diagram of a computer system in accordance with an embodiment of the present disclosure.

FIG. 1 is an example of a simplified functional block diagram of a computer system 100. The functional descriptions of the present invention can be implemented in hardware, software or some combination thereof.

As shown in FIG. 1, the computer system 100 includes a processor 102, a memory system 104 and one or more input/output (I/O) devices 106 in communication by a communication "fabric". The communication fabric can be implemented in a variety of ways and may include one or more computer buses 108, 110 and/or bridge and/or router devices 112 as shown in FIG. 1. The I/O devices 106 can include network adapters and/or mass storage devices from which the computer system 100 can send and receive data, such as video streaming data, computer instructions, commands, or the like. The computer system 100 may be in communication with the Internet via the I/O devices 108.

Those of ordinary skill in the art will recognize that many modifications and variations of the present invention may be implemented without departing from the spirit or scope of the invention. Thus, it is intended that the present invention cover the modification and variations of this invention provided they come within the scope of the appended claims and their equivalents.

The various illustrative logics, logical blocks, modules, and engines, described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an ASIC. Additionally, the ASIC may reside in a user terminal. In the alternative, the processor and the storage medium may reside as discrete components in a user terminal. Additionally, in some embodiments, the steps and/or actions of a method or algorithm may reside as one or any combination or set of instructions on a machine readable medium and/or computer readable medium.

Figure 2A:
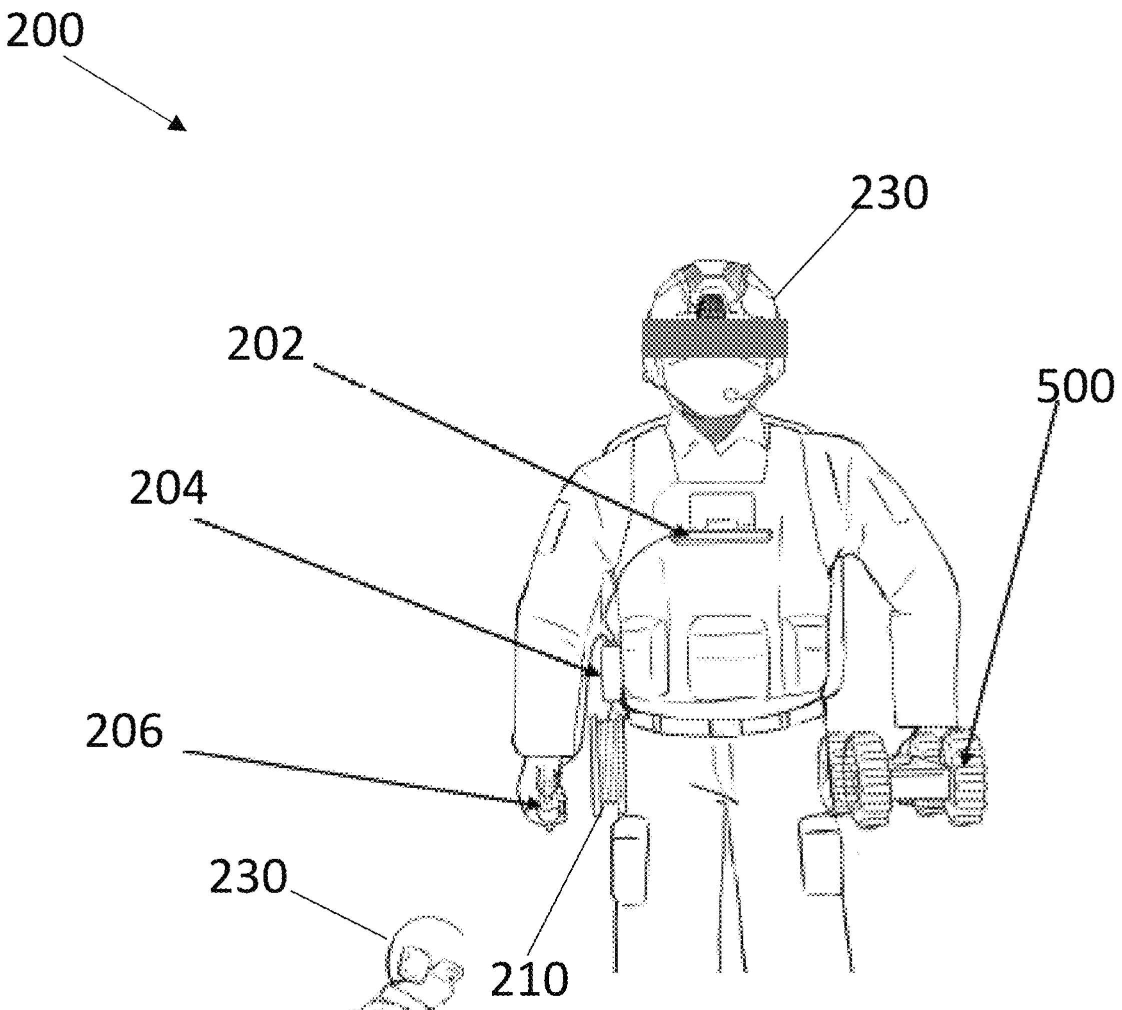
FIG. 2A is a front view of an operator wearing parts of a robotic system, in accordance with an embodiment of the present disclosure.
Figure 2B:
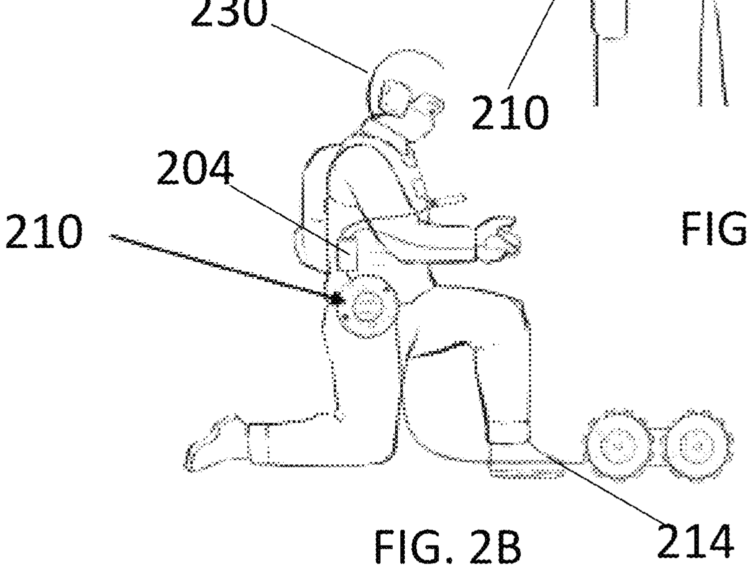
FIG. 2B is a side view of the operator wearing parts of the robotic system of FIG. 2A.
Figure 3:
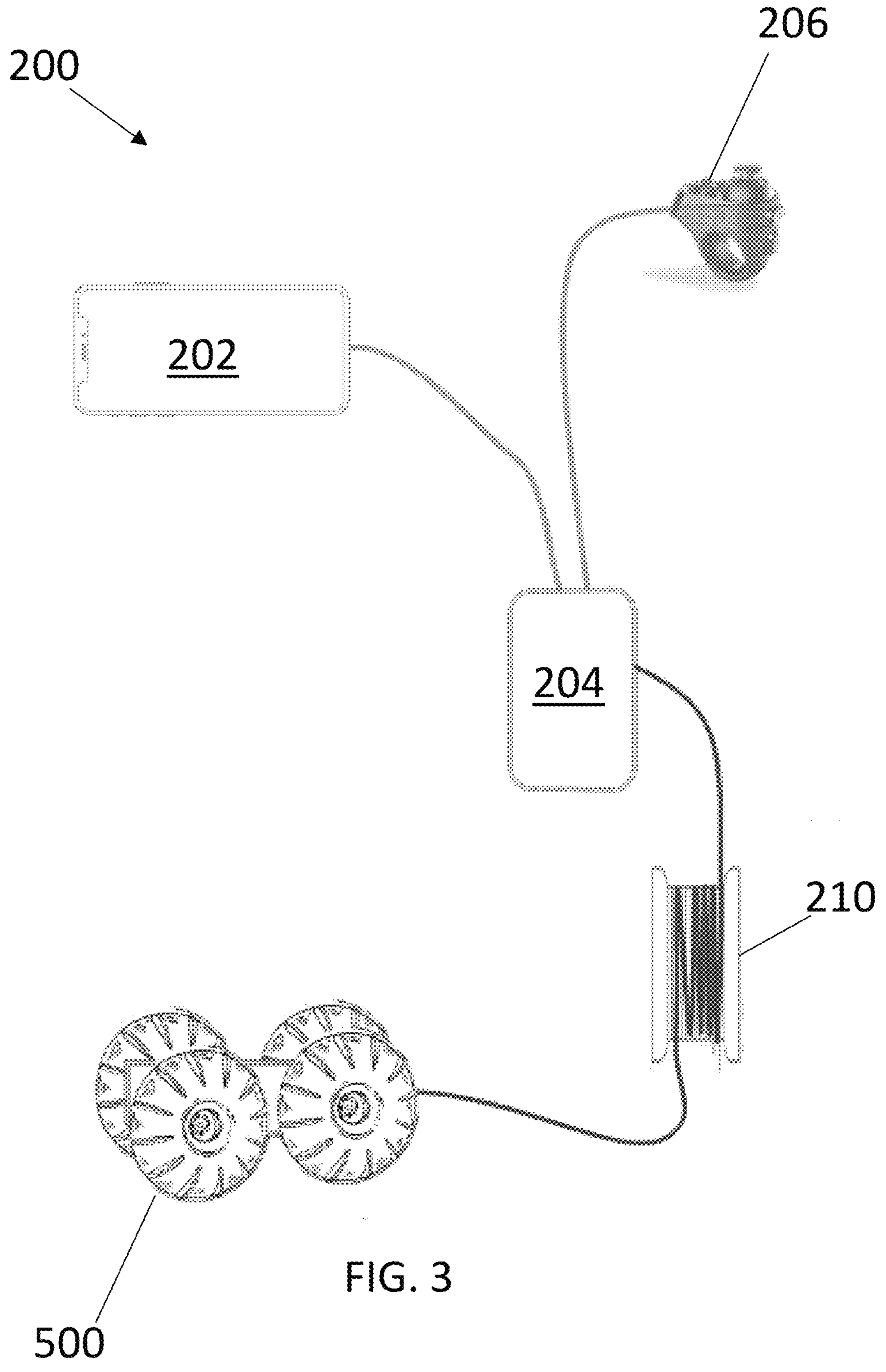
FIG. 3 is a configuration diagram of the robotic system shown in FIGS. 2A and 2B.

FIGS. 2A, 2B, and 3 illustrate a robotic system 200 in accordance with an embodiment of the present disclosure. FIGS. 2A-2B show parts of robotic system 200 being worn by an operator 230. More particularly, FIG. 2A is a front view of operator 230 wearing components of robotic system 200 and FIG. 2B is a side view of single operator 230 wearing components of robotic system 200. FIG. 3 is a diagram of robotic system 200 shown in FIGS. 2A-2B. As will be discussed in more detail below, operator 230 may be a single person in a dynamic threat environment. Robotic system 200 comprises a live-feed camera display 202, a control box 204, a controller 206, a robotic platform 500, and optionally, a spool for wire management 210. Robotic platform 500 may comprise an unmanned ground vehicle, an unmanned aerial device (e.g., a drone, including but not limited to a micro drone, a tactical drone, a combat drone, a reconnaissance drone, a GPS drone, and/or any other drone known in the art), a hovercraft, an underwater surveillance system, a robot of various shapes and sizes (e.g., a spherical robot), a smart vehicle, and/or a radio-controlled vehicle. However, the foregoing lists are meant to be merely exemplary and not exhaustive.

In some embodiments, control box 204 is attached to a tactical vest or other garment worn by operator 230. Control box 204 is communicatively coupled to camera display 202 and controller 206. Control box 204 is communicatively coupled to camera display 202 via a wired or wireless connection. For example, in some embodiments, control box 204 is communicatively coupled to camera display 202 via a USB-C connection. Similarly, control box 204 is communicatively coupled to controller 206 via a wired or wireless connection. For example, in some embodiments, control box 204 is communicatively coupled to controller 206 via a USB-C connection. In some embodiments, robotic platform 500 and control box 204 are communicatively coupled via a wired or wireless communication. For example, in some embodiments, robotic platform 500 and control box 204 are communicatively coupled via a cable 214 (e.g., a CAT-6 cable). In some embodiments, robotic system 200 may further comprise a cable reel 210. Cable reel 210 may be used to manage cable 214 connecting control box 204 and robotic platform 500. In some embodiments, cable reel 210 is configured to be mounted on a belt or other garment of operator. Additionally, or alternatively, components of system 200 may communicate through a mobile phone network (e.g., 3G, 4G, 5G, 6G, etc.) and/or using a variety of communication technologies, such as radio frequency (RF) (e.g., wireless fidelity (WiFi®) and Bluetooth®), satellite links and the like.

Camera display 202 may be any computing device capable of displaying video and/or images. For example, in some embodiments, camera display 202 comprises a mobile device. However, as will be appreciated by one having ordinary skill in the art, camera display 202 may comprise a smart watch, smart contact lenses, augmented reality glasses, virtual reality headset, mixed or extended reality headset or glasses, wearables, and/or other electronic or electrical devices. Robotic platform 500 includes a camera, as discussed in more detail below. Camera display 202 is configured to display images, video, and/or audio captured by the camera of robotic platform 500. In some embodiments, camera display 202 is configured to attach to a tactical vest or other garment worn by operator 230. In some embodiments, camera display 202 is positioned such that operator 230 is able to easily view and/or listen to the images, video, and/or audio captured by the camera of robotic platform 500. For example, in some embodiments, such as the embodiment illustrated in FIGS. 2A and 2B, camera display 202 is configured to attach to a tactical vest worn by operator 230 in a horizontal manner so that operator 230 may simply look down to view camera display 202.

Controller 206 is configured to receive inputs from an operator. In some embodiments, controller 206 comprises a small, single hand controller. In further embodiments, controller 206 includes a joystick and/or control key. Additionally, or alternatively, controller 206 comprises other control mechanisms, such as a virtual button accessible by operator via a user interface.

In some embodiments, robotic platform 500 is relatively small in size, as discussed in more detail below with regards to FIG. 6, and is configured to be clipped to the back of the tactical vest or other garment worn by operator 230, or slung over the back of the operator with a strap when not in use.

In some embodiments, control box 204 comprises at least one transmitter, at least one processor and/or at least one memory. Control box 204 receives instructions from controller 206 associated with the user inputs, translates the instructions into radio frequency or other electrical signal, and then transmits this information to robotic platform 500. Robotic platform 500 then passes this information to one or more mechanical components of robotic platform 500, such as servos, motor controllers, and the like. In some embodiments, the platform is robot-agnostic.

Figure 4A:
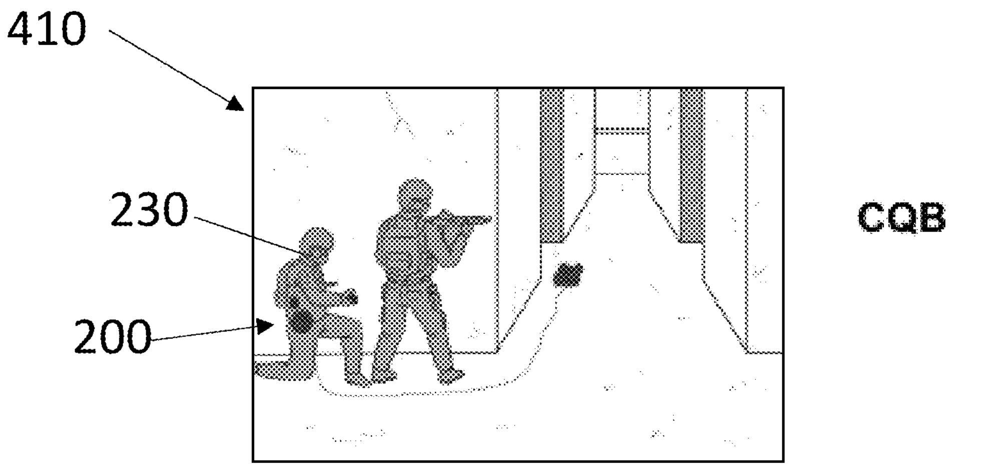
FIG. 4A illustrates a close quarters use case of the robotic system of FIGS. 2A, 2B, and 3.
Figure 4B:
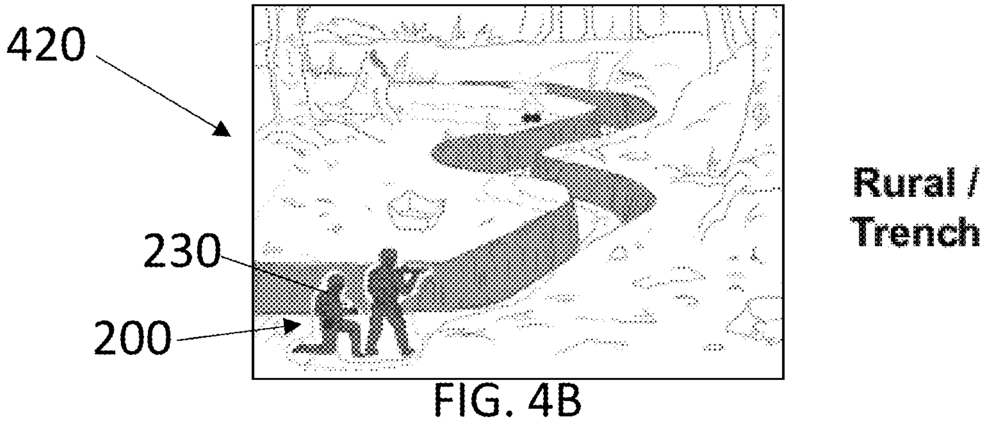
FIG. 4B illustrates a rural/trench use case of the robotic system of FIGS. 2A, 2B, and 3.
Figure 4C:
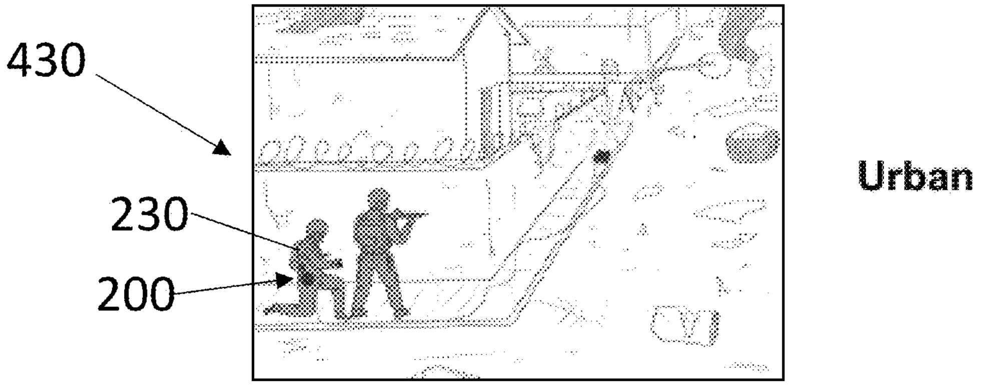
FIG. 4C illustrates an urban use case of the robotic system of FIGS. 2A, 2B, and 3.

FIGS. 4A-4C illustrate example use cases of the disclosed invention. More particularly, FIG. 4A illustrates robotic system 200 in a close quarters battle environment 410, FIG. 4B illustrates robotic system 200 in a rural/trench environment 420, and FIG. 3C illustrates robotic system 200 in an urban environment 430. In every terrain, the operator 230 can maneuver the platform around corners and bends.

Figure 5A:
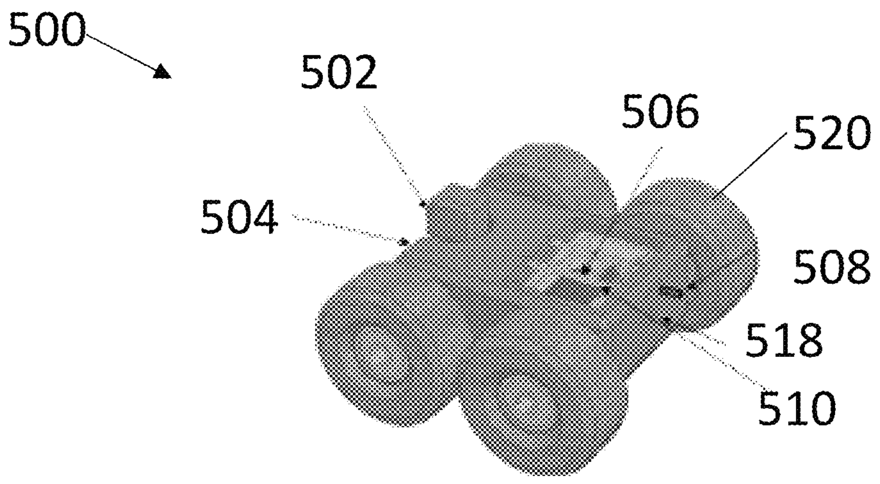
FIG. 5A is a diagram of the robotic platform of FIGS. 2A, 2B, and 3 in an armed state.
Figure 5B:
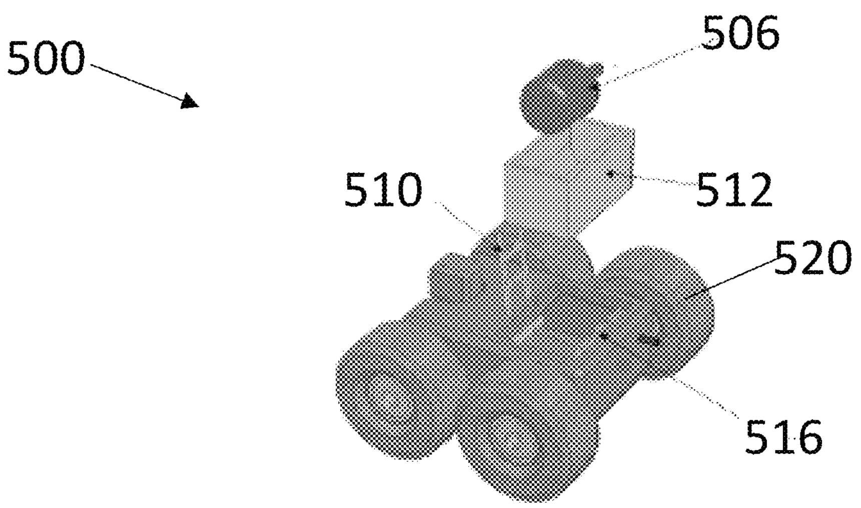
FIG. 5B is a diagram of the robotic platform of FIGS. 2A, 2B, and 3 in a firing state.

FIGS. 5A-5B provide a functional overview robotic platform 500. More particularly, FIG. 5A shows a robotic platform 500 in an armed state, while FIG. 5B shows robotic platform 500 in a firing state. In some embodiments, robotic platform 500 includes a camera 502. In some embodiments, camera 502 comprises a wide-angle camera (e.g., a 180-degree camera), a red-green-blue (RGB) camera, a red-clear-clear-blue (RCCB) camera, a short-wave infrared (SWIR) camera, a mid-wave infrared (MWIR) camera, a long-wave infrared (LWIR) camera, a hyperspectral camera, and/or a neuromorphic camera. In some embodiments, robotic platform 500 comprises a battery 504. Battery 504 may be located at a front end of robotic platform 500. In some embodiments, battery 504 comprises a rechargeable battery. In the embodiment illustrates in FIGS. 5A and 5B, robotic platform 500 includes four wheels 520 which enable the robotic platform 500 to move. However, as will be appreciated by one having ordinary skill in the art, robotic platform 500 may comprise any number of wheels 520. For example, in some embodiments, robotic platform 500 includes three wheels. Additionally, or alternatively, robotic platform 500 may include another mechanism which enables robotic platform to move, such as one or more track pads, one or more grouser pads, and the like. Additionally, or alternatively, robotic platform 500 may comprise an unmanned ground vehicle, an unmanned aerial device (e.g., a drone, including but not limited to a micro drone, a tactical drone, a combat drone, a reconnaissance drone, a GPS drone, and/or any other drone known in the art), a hovercraft, an underwater surveillance system, a robot of various shapes and sizes (e.g., a spherical robot), a smart vehicle, and/or a radio-controlled vehicle. However, the foregoing lists are meant to be merely exemplary and not exhaustive.

Robotic platform 500 includes a payload 506. In some embodiments, when robotic platform 500 is in an armed position, as shown in FIG. 5A, payload 506 is located within an adaptor 512. In some embodiments, adaptor is configured to fit inside a payload bay, (e.g., an aperture) located on a top portion of robotic platform 500. In some embodiments, robotic platform 500 may be configured to receive various different adaptors 512, the different adaptors 512 designed for different payload profiles. Payload 506 is held in place by one or more latches 510. Robotic platform 500 may further comprise a payload safety pin which must be removed prior to deployment down range, as discussed in more detail below. Robotic platform 500 may further comprise a control wire port 518 (e.g., an ethernet port). FIG. 5B illustrates robotic platform 500 system after firing. More particularly, FIG. 5B illustrates robotic platform 500 with latches 510 released via the latches release mechanism 516 and the payload 506 in an eject position.

In some embodiments, robotic platform 500 may include an LED light, or other indicator, indicating a state of robotic platform 500, as discussed in more detail below.

Figure 6:
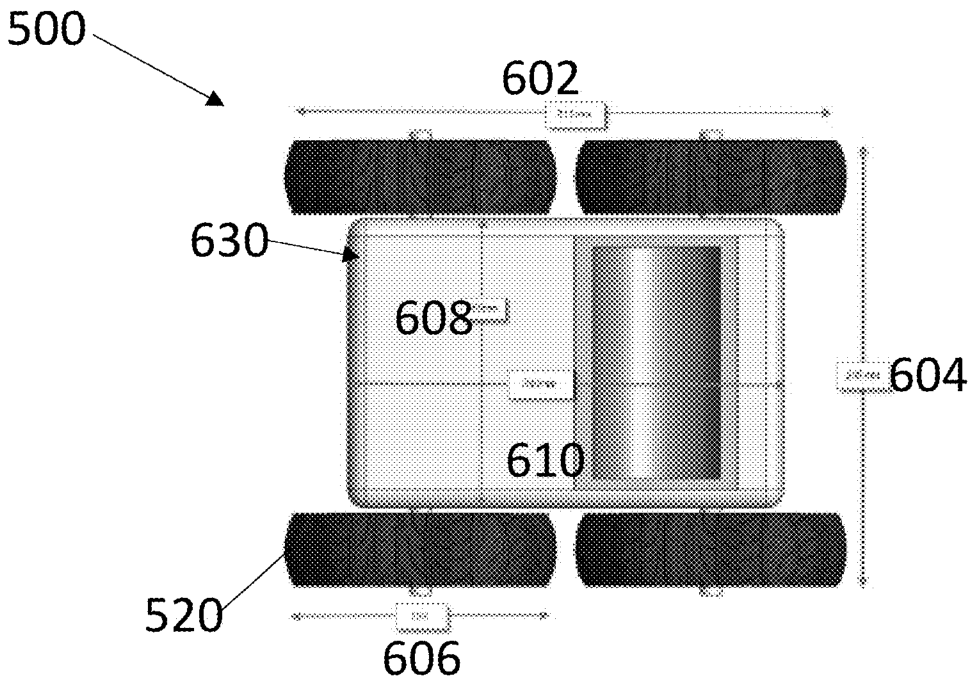
FIG. 6 is a top view of the robotic platform of FIGS. 2A, 2B, and 3.

FIG. 6 is a top view of robotic platform 500. In some embodiments, robotic platform 500 has a total width 602 of about 250 mm to about 350 mm, and more particularly, 310 mm. In some embodiments, robotic platform 500 has a total length 604 of about 200 mm to about 300 mm, and more particularly, 245 mm. In some embodiments, a body 630 of robotic platform 500 which is connected to wheels has a width 610 of about 200 mm to about 300 mm, and more particularly 240 mm. In some embodiments, body 630 of robotic platform 500 has a length 608 of about 100 mm to about 200 mm, and more particularly 160 mm. In some embodiments, a single wheel 520 of robotic platform has a diameter of about 100 mm to about 200 mm, and more particularly 150 mm.

Figure 7A:
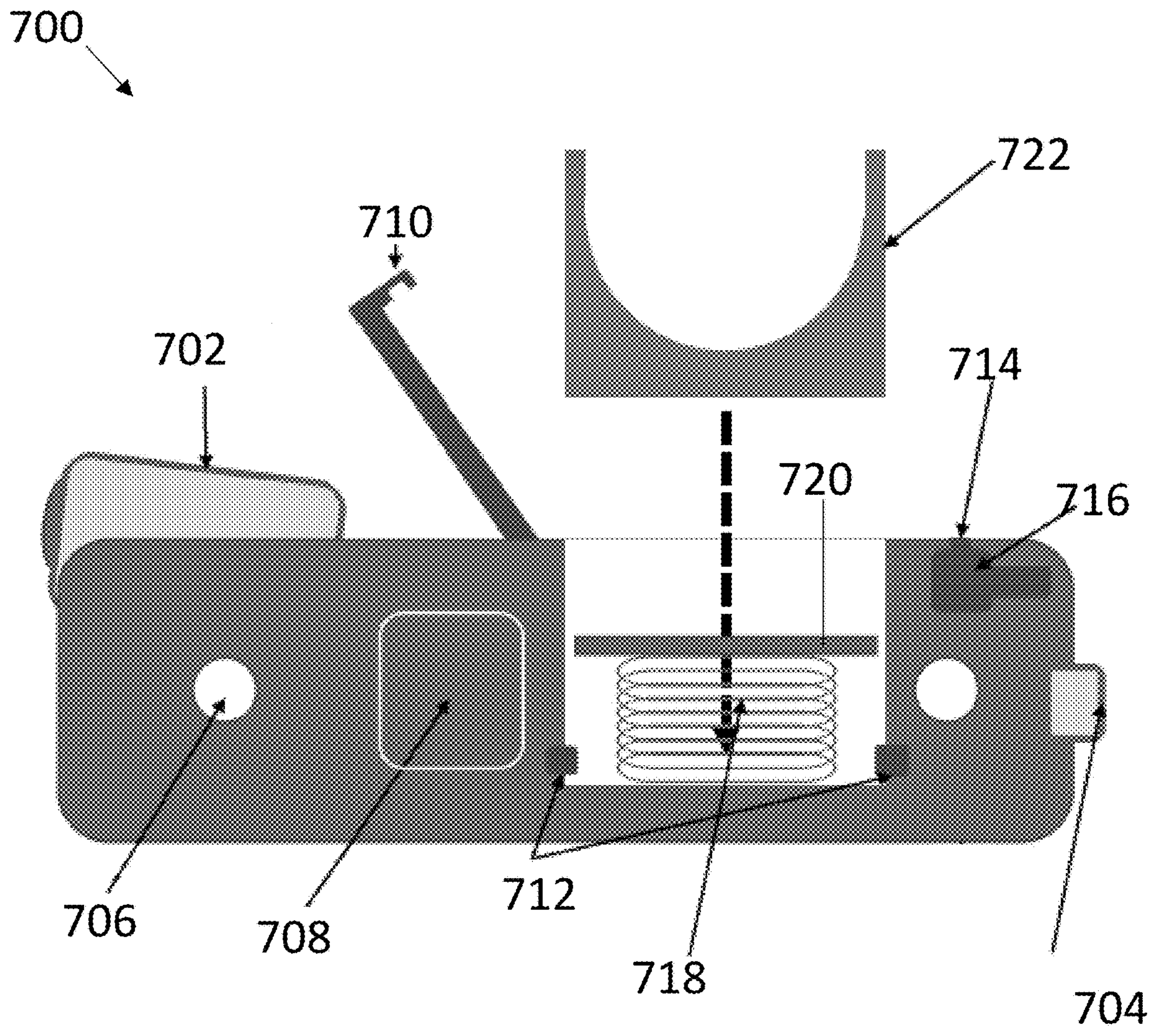
FIG. 7A is a side view of a robotic platform, in accordance with an embodiment of the present disclosure.

FIG. 7A is a side view showing details of a payload release system of a robotic platform 700. Robotic platform 700 may include any and all features of robotic platform 500 shown in FIGS. 1-6 and robotic platform 700 may be used in robotic system 200 shown in FIGS. 2A, 2B, and 3. At a first end of robotic platform 700 is a camera 702 and at second end opposite the first end is a control wire port 704, as discussed above. In the embodiment illustrated in FIG. 7, robotic platform 700 includes a drive wheel opening 706, where a wheel may be attached to robotic platform 700. Robotic platform 700 further includes a battery compartment 708 configured to a battery, such as a rechargeable battery, as discussed above. The latching system includes one or more latches 710, an ejector pusher plate release mechanism 720, a latch receptacle 714 configured to receive one or more latches 710, a latch release mechanism 716, and one or more ejector mechanism compression springs 718. In some embodiments, ejector mechanism compression spring 718 can propel a 600 g object to 50 cm with the pusher plate 720 on top of compression spring 718. A payload adapter sleeve 722 can be modified to accommodate different payloads, as discussed above. In some embodiments, payload adapter sleeve 722 manufactured via 3D printing.

Figure 7B:
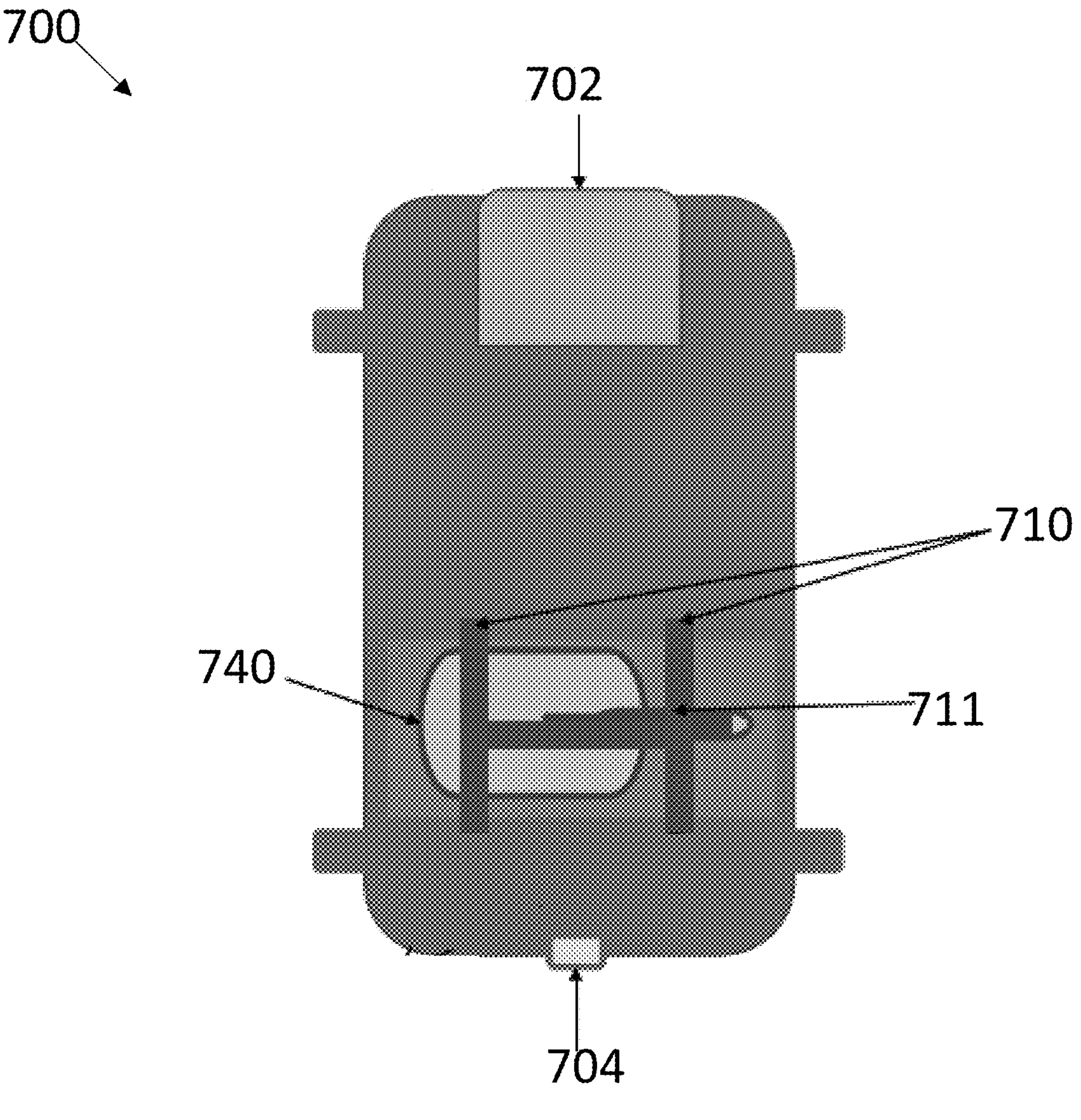
FIG. 7B is a top view of the robotic platform of FIG. 7A in a loaded state.
Figure 7C:
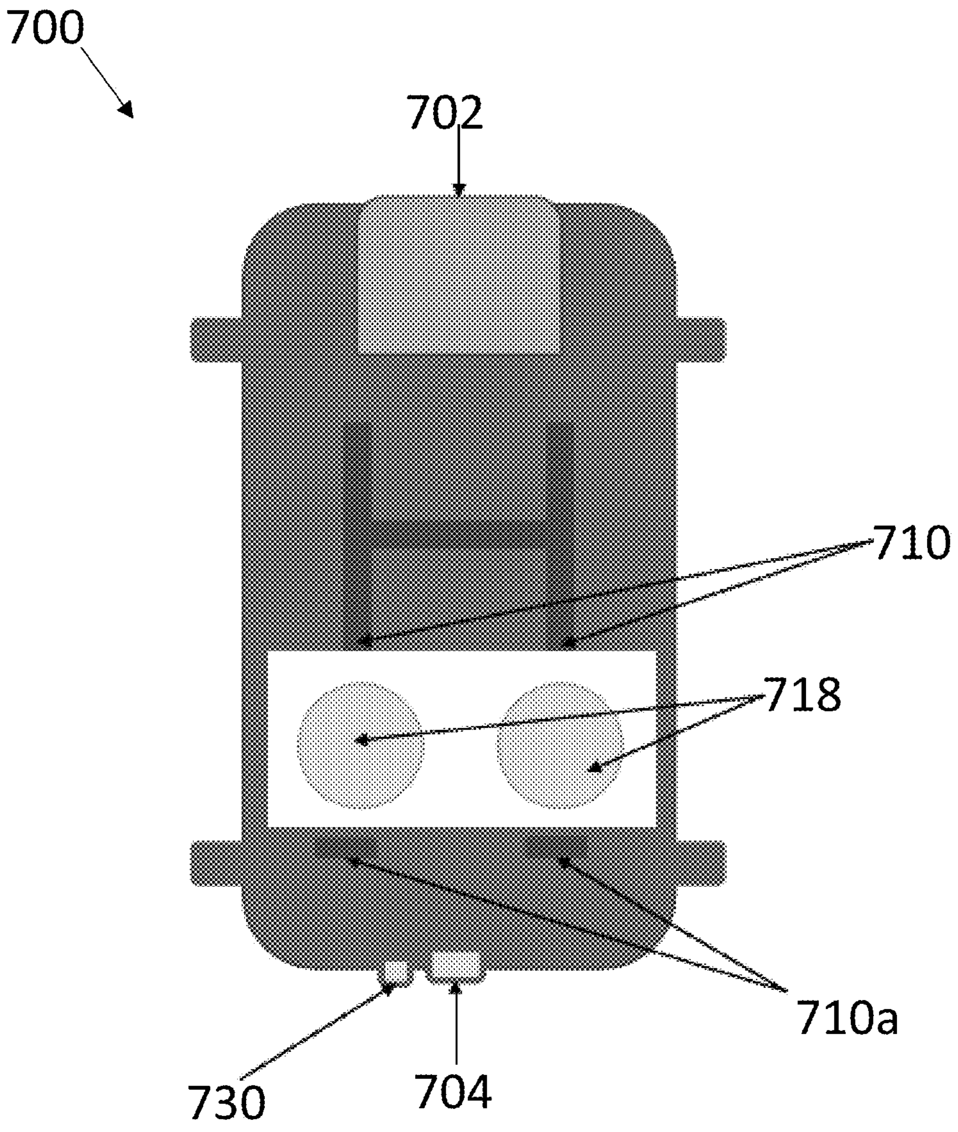
FIG. 7C is a top view of the robotic platform of FIG. 7B in a released state.

FIGS. 7B and 7C illustrate robotic platform 700 from a top view when payload release system is loaded, and released, respectively. When loaded, latches 710 and a latch cross member 711 are secured by latch release mechanism 716 (shown in FIG. 7A), all which hold the payload in place, as shown in FIG. 7B. Compression springs 718 with pusher plates 720 (shown in FIG. 7A) push the payload 740 when released. When payload 740 is released, compression springs 718 lift latches 710 and hold latches 710 against a top portion of robot platform 700, as shown in FIG. 7C. A portion of latches **710*a* are secured in latch release mechanism 716. In some embodiments, after payload release system is released, a loading safety release button 730** indicates the payload has been released, as shown in FIG. 7C.

Robotic platform 700 may comprise a small vehicle. For example, in some embodiments, robotic platform 700 may include one or more wheels. For example, in some embodiments robotic platform 700 may include four wheels or three wheels which enable robotic platform 700 to move. However, as will be appreciated by one having ordinary skill in the art, robotic platform 700 may comprise any number of wheels. Additionally, or alternatively, robotic platform 700 may include another mechanism which enables robotic platform to move, such as one or more track pads, one or more grouser pads, and the like. Additionally, or alternatively, robotic platform 700 may comprise an unmanned ground vehicle, an unmanned aerial device (e.g., a drone, including but not limited to a micro drone, a tactical drone, a combat drone, a reconnaissance drone, a GPS drone, and/or any other drone known in the art), a hovercraft, an underwater surveillance system, a robot of various shapes and sizes (e.g., a spherical robot), a smart vehicle, and/or a radio-controlled vehicle. However, the foregoing lists are meant to be merely exemplary and not exhaustive.

Figure 8A:
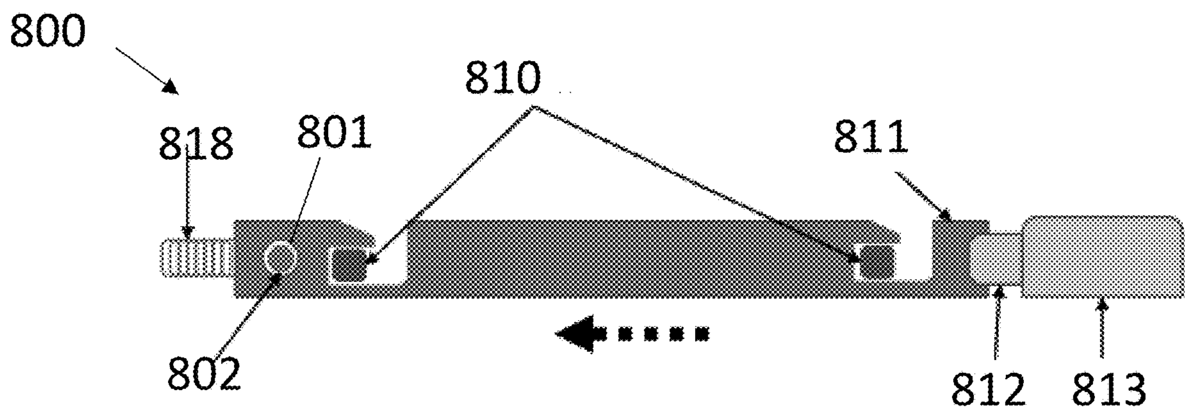
FIG. 8A is a side view of a payload latching release system, in accordance with an embodiment of the present disclosure.
Figure 8B:
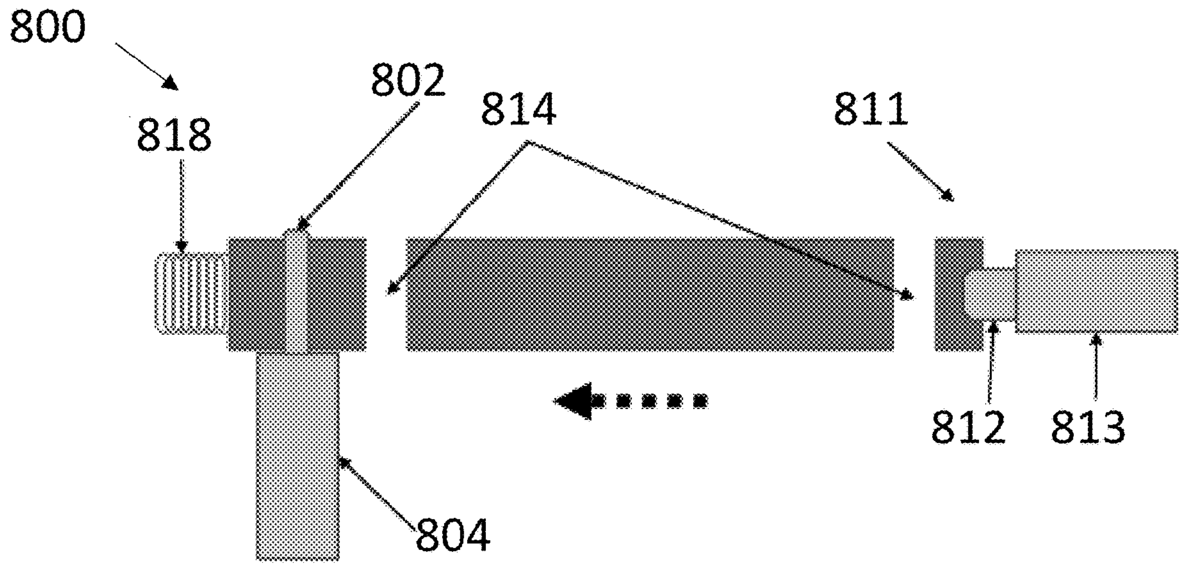
FIG. 8B is a top view of the payload latching release system of FIG. 8A.

FIG. 8A is a side view and FIG. 8B is a top view of a payload latching release system 800, according to one embodiment of the disclosure. Payload latching release system 800 may be used with any robotic platform disclosed above (e.g., robotic platform 500 shown in FIGS. 1-6 and/or robotic platform 700 shown in FIGS. 7A-7C). For example, payload latching release system 800 may be utilized with any type of robotic platform, including but not limited to, an unmanned ground vehicle, an unmanned aerial device (e.g., a drone, including but not limited to a micro drone, a tactical drone, a combat drone, a reconnaissance drone, a GPS drone, and/or any other drone known in the art), a hovercraft, an underwater surveillance system, a robot of various shapes and sizes (e.g., a spherical robot), a smart vehicle, and/or a radio-controlled vehicle. However, the foregoing lists are meant to be merely exemplary and not exhaustive.

Payload latching release system 800 may include a compression spring 818 holding latches 810 secure. A safety hole 801 may be blocked by a solenoid shaft 802 which is connected to a solenoid body 804, preventing movement of latches 810, a locking bar 811, liner actuator shaft 812 and liner actuator body 813. The arrow in FIGS. 8A and 8B illustrate the movement of locking bar 811 into the firm position. Latch slots 814 in FIG. 8B show apertures in payload latching release system 800 after latches 810 have been released.

FIGS. 9A-9D are side views of a payload latching release system 900, according to another embodiment of the disclosure. Payload latching release system 900 may be used with any robotic platform disclosed above. For example, payload latching release system 900 may be utilized with any type of robotic platform, including but not limited to an unmanned ground vehicle, an unmanned aerial device (e.g., a drone, including but not limited to a micro drone, a tactical drone, a combat drone, a reconnaissance drone, a GPS drone, and/or any other drone known in the art), a hovercraft, an underwater surveillance system, a robot of various shapes and sizes (e.g., a spherical robot), a smart vehicle, and/or a radio-controlled vehicle. However, the foregoing lists are meant to be merely exemplary and not exhaustive.

Figure 9A:
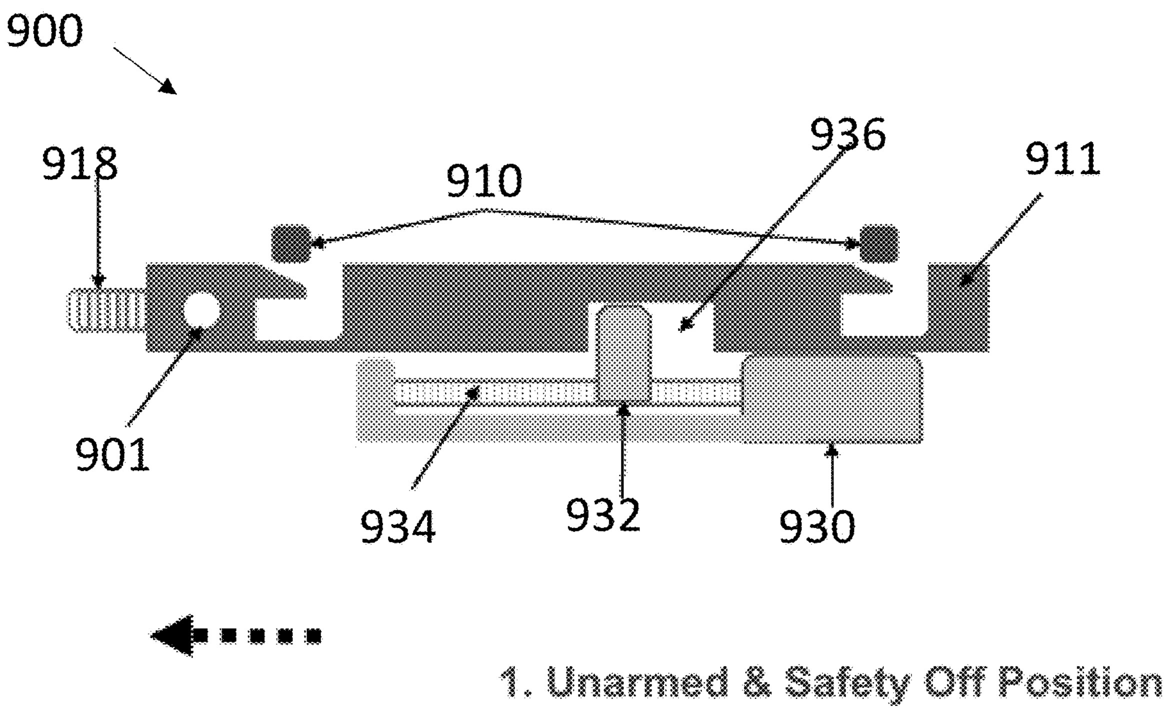
FIG. 9A is a side view of a payload latching release system in an unarmed and safety off position, in accordance with another embodiment of the present disclosure.

FIG. 9A illustrates payload latching release system 900 in an unarmed and safety off position. In the unarmed and safety off position, a safety hole 901 is not blocked by anything, such as a solenoid shaft, and a compression spring 918 holding a locking bar 911 is in locked position with latches 910 outside of locking bar 911. A liner actuator body 930, a linear actuator follower 932, and a screw drive 934 are positioned with a gap 936 which allows for lateral movement in locking bar 911 to allow latches 910 to push into locking position.

Figure 9B:
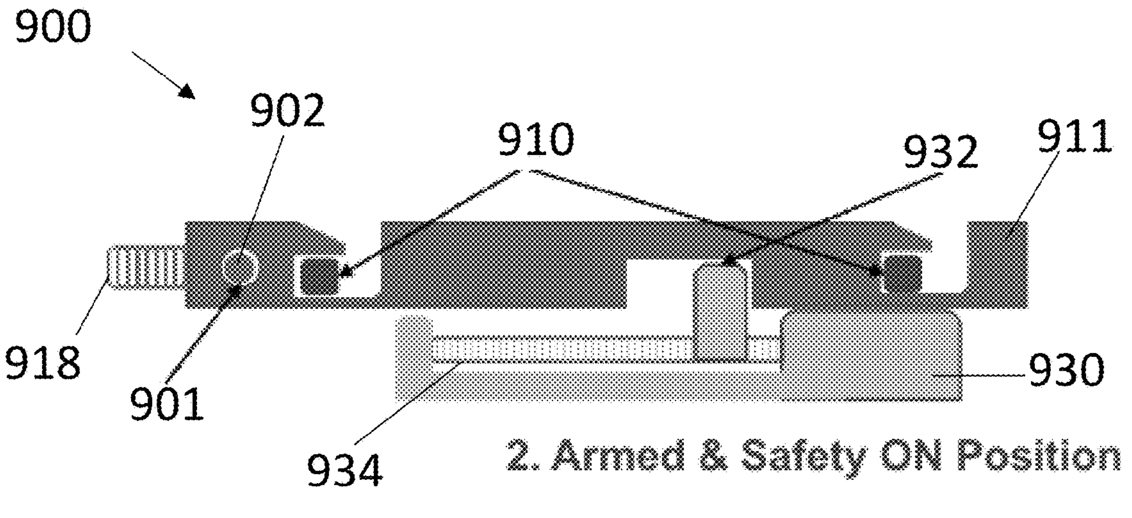
FIG. 9B is a side view of the payload latching release system of FIG. 9A in an armed and safety on position.

FIG. 9B illustrates payload latching release system 900 in an armed and safety on position. When armed with the safety on, latches 910 are outside of locking bar 911, and safety hole 901 is blocked by a solenoid shaft 902 connected to a solenoid body (not shown), and liner actuator follower 932 is positioned so that the release bar cannot move.

Figure 9C:
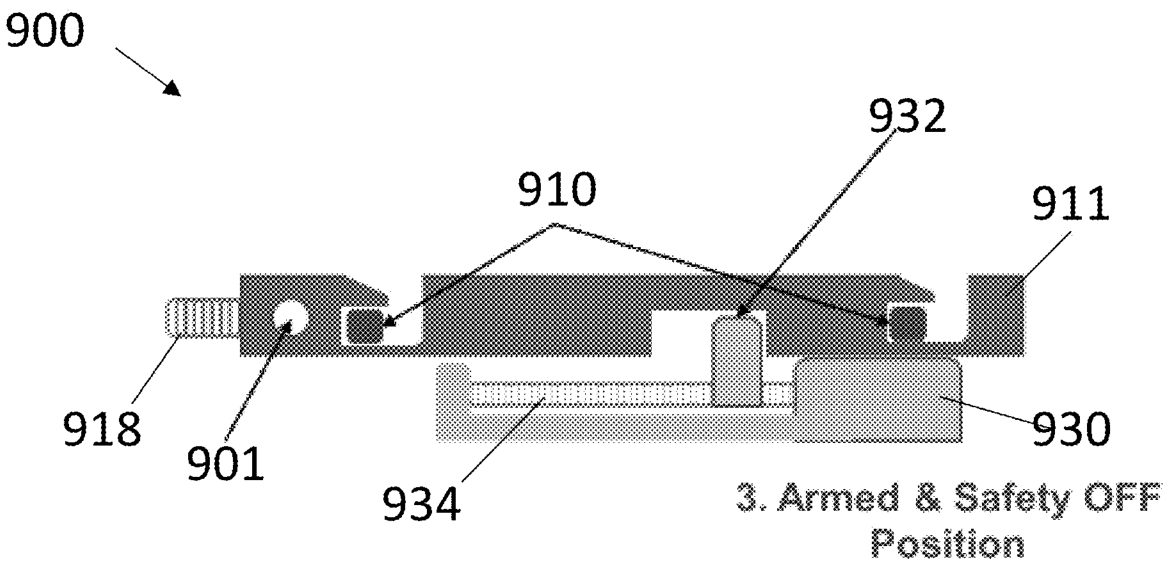
FIG. 9C is a side view of the payload latching release system of FIG. 9A in an armed and safety off position.

FIG. 9C illustrates payload latching release system 900 when armed with the safety off. When payload latching release system 900 is armed with the safety off, safety hole 901 is not blocked by solenoid shaft 902.

Figure 9D:
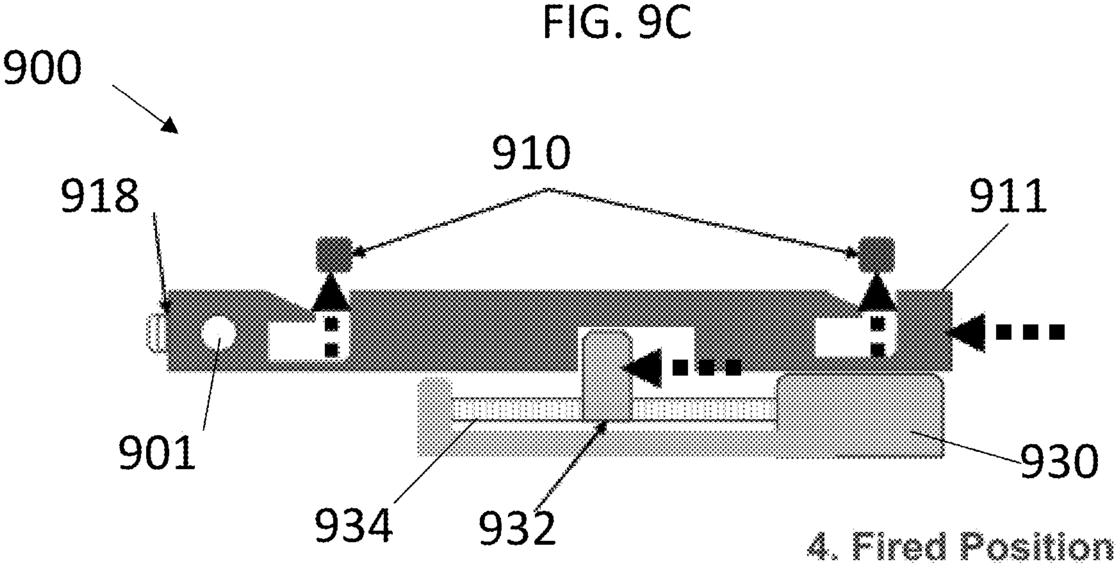
FIG. 9D is a side view of the payload latching release system of FIG. 9A in fired position.

FIG. 9D illustrates payload latching release system 900 in a fired position. When payload latching release system 900 is in a fired position, compression spring 918 previously holding locking bar 911 secure is compressed, liner actuator follower 932 pushes locking bar 911 to a firing position, and latches 910 are released, as shown by arrows in FIG. 9D.

Figure 10:
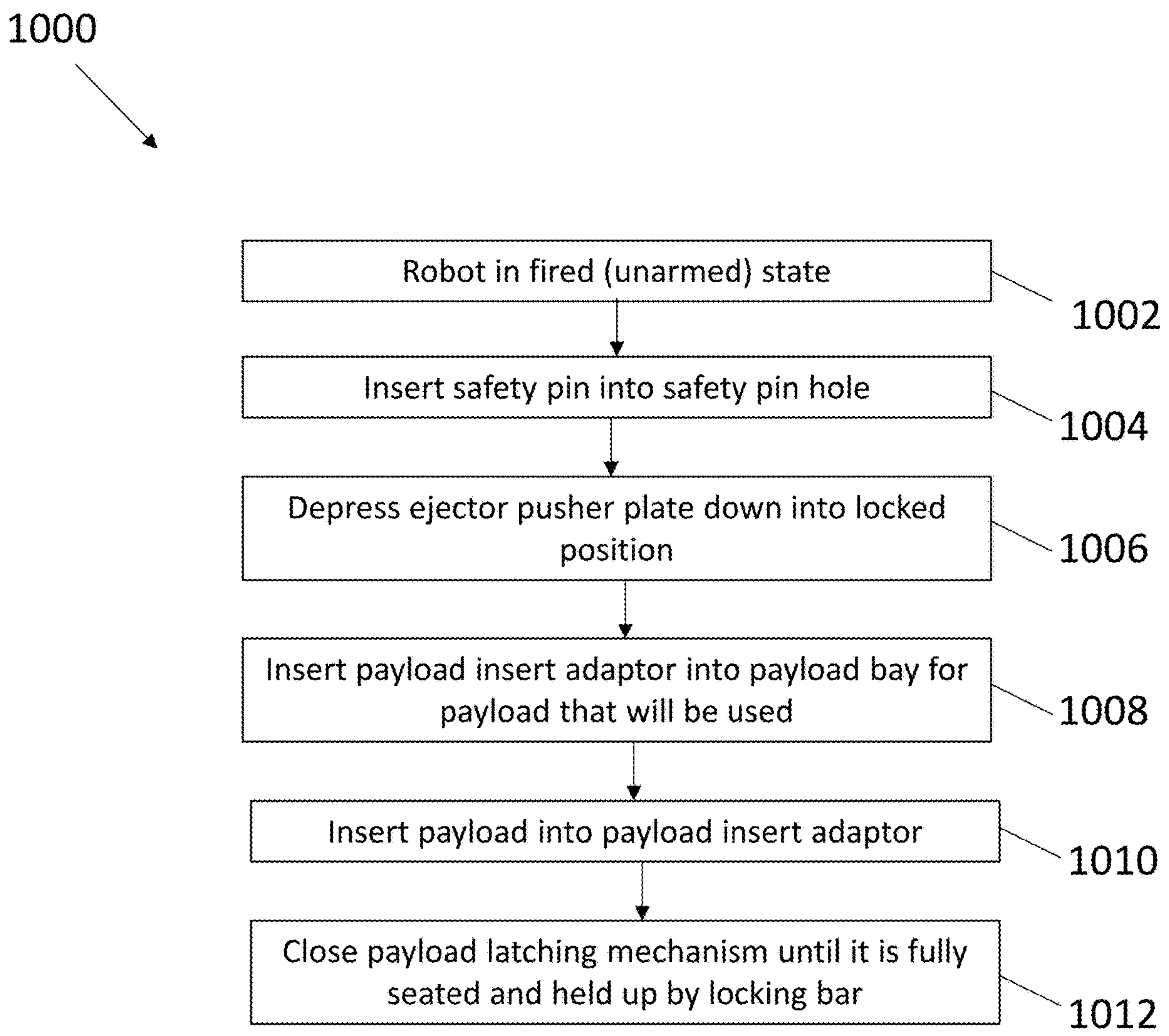
FIG. 10 is a flow diagram of a loading sequence of a robotic system, in accordance with an embodiment of the present disclosure.

FIG. 10 is a flow diagram of a loading sequence 1000 of a robotic system in accordance with the present disclosure. At 1002, a robotic platform (e.g., robotic platform 500 shown in FIGS. 1-6 and/or robotic platform 700 shown in FIG. 7) of a robotic system (e.g., robotic system 200) is in a fired (unarmed) state. The robotic platform may be an unmanned ground vehicle, an unmanned aerial device (e.g., a drone, including but not limited to a micro drone, a tactical drone, a combat drone, a reconnaissance drone, a GPS drone, and/or any other drone known in the art), a hovercraft, an underwater surveillance system, a robot of various shapes and sizes (e.g., a spherical robot), a smart vehicle, and/or a radio-controlled vehicle. However, the foregoing lists are meant to be merely exemplary and not exhaustive. If the robotic platform is not in a fired (unarmed) state, an operator would go through a firing sequence to prepare the robotic platform for the loading sequence. In some embodiments, robotic platform comprises an LED indicator indicating a state of the robotic platform. For example, in some embodiments, the robotic platform may be a solid green when in a fired (unarmed state), indicating the robotic platform is ready for loading.

At 1004, a safety pin is inserted into a safety pin hole of robotic platform. In some embodiments, the LED indicator of the robotic platform flashes yellow after safety pin is inserted into the safety pin hole. In some embodiments, the process cannot proceed until the safety pin has been inserted. When the safety pin is inserted, an ejection release mechanism and latching bar of the robotic platform will move into the necessary positions.

At 1006, the operator depresses an ejector pusher plate downward into the robotic platform until it locks into position, held by the ejector release mechanism. In some embodiments, the LED indicator turns a solid yellow in this state.

At 1008, the operator inserts a payload insert adapter into a payload bay (e.g., an aperture in robotic platform) for the payload that will be used until it is fully seated.

At 1010, the operator inserts the payload, spoon upwards, into the payload insert adaptor.

At 1012, the user closes the payload latching mechanism until it is fully seated and being held by the locking bar. Once the locking bar is fully seated, the robotic system will detect this state and (i) the safety solenoid will automatically insert itself into the locking bar, preventing movement of the locking bar, and (ii) the linear actuator will move into the "safe" position, also physically blocking movement of the locking bar. In some embodiments, the LED indicator will turn solid red in this state.

Figure 11:
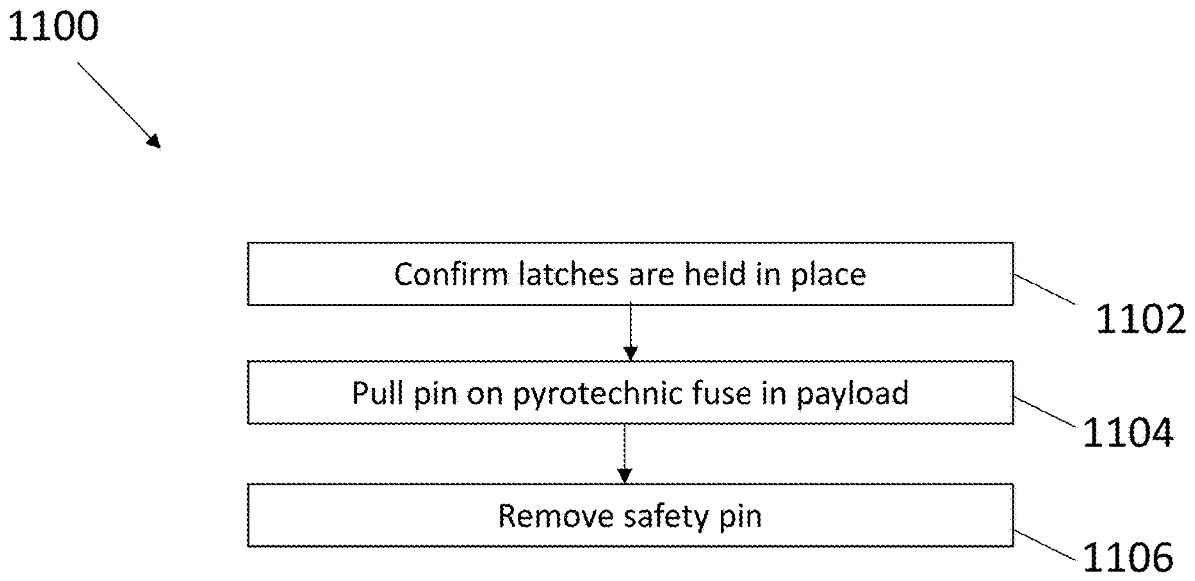
FIG. 11 is a flow diagram of a loading sequence of a robotic system in accordance with an embodiment of the present disclosure.

FIG. 11 is a flow diagram of a loading sequence 1100 of a robotic system in accordance with the present disclosure, and may follow the process described in FIG. 10. At 1102, the operator visually verifies latches of the robotic platform are being held in place. As noted, above, the robotic platform may comprise an unmanned ground vehicle, an unmanned aerial device (e.g., a drone, including but not limited to a micro drone, a tactical drone, a combat drone, a reconnaissance drone, a GPS drone, and/or any other drone known in the art), a hovercraft, an underwater surveillance system, a robot of various shapes and sizes (e.g., a spherical robot), a smart vehicle, and/or a radio-controlled vehicle. In some embodiments, the operator further confirms the LED indicator is solid red. At 1104, the operator pulls the pin on the pyrotechnic fuse in the payload. At 1106, just prior to deployment, the operator removes the safety pin from the robot. In some embodiments, the LED indicator turns flashing red in this state. The robotic platform is now in an "armed" state.

Figure 12:
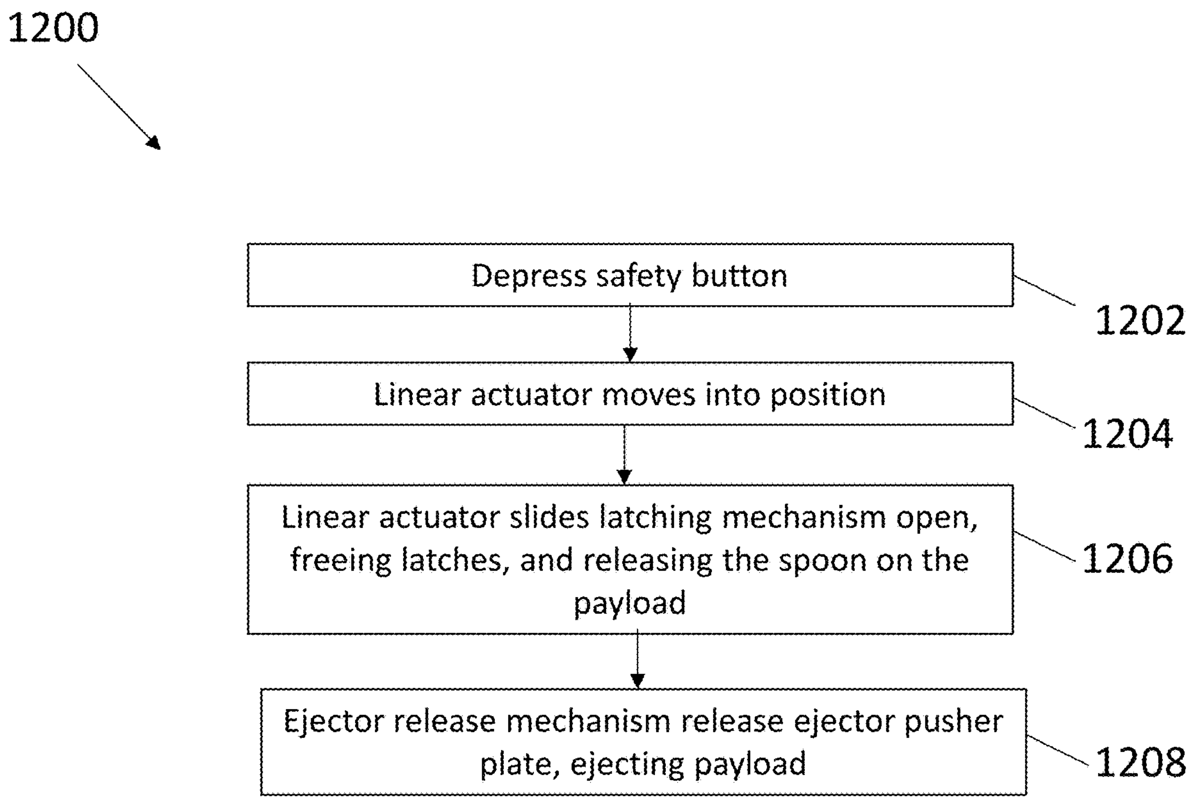
FIG. 12 is a flow diagram of a firing sequence of a robotic system in accordance with an embodiment of the present disclosure.

FIG. 12 is a flow diagram of a firing sequence 1200 of a robotic system in accordance with the present disclosure, and may follow the process described in FIG. 11. At 1202, the operator depresses and holds a safety button on a control module body. Additionally, or alternatively, the operator depresses a button or actuates another mechanism on a hand controller. In some embodiments, upon activation of the one or more buttons, the LED indicator may begin to flash red.

At 1204, the operator depressing the one or more buttons, the control box sends instructions to the robotic platform robotic platform (e.g., an unmanned ground vehicle, an unmanned aerial device, a hovercraft, an underwater surveillance system, a spherical robot, a smart vehicle, and/or a radio-controlled vehicle), which causes the linear actuator of the robotic platform to move into a pre-firing position and the safety solenoid of robotic platform to withdraw from the safety hole in the locking bar. In such a state, the robotic platform is armed. In some embodiments, the LED indicator turns solid red in this state.

At 1206, the operator may depress or otherwise activate a trigger mechanism on hand controller. In some embodiments, other buttons or mechanisms must be activated simultaneously (e.g., the safety button on control module, another button on the hand controller, etc.). In response to the trigger mechanism being activated, the control box sends instructions to the robotic platform causing the linear actuator to slide the latching mechanism to an open state, freeing the latches which are under spring tension, which move out of the way, and releasing the spoon on the payload pyrotechnic fuse.

At 1208, the control box sends instructions to the robotic platform which cause the ejector release mechanism to release the ejector pusher plate, allowing one or more compression springs underneath the ejector pusher plate to propel the ejector pusher plate upward, in turn ejecting the payload.

Those of ordinary skill in the art will recognize that many modifications and variations of the present invention may be implemented without departing from the spirit or scope of the invention. Thus, it is intended that the present invention cover the modification and variations of this invention provided they come within the scope of the appended claims and their equivalents.

It is appreciated that the described details are merely illustrative of a configuration in which the herein described systems and methods may operate, and thus does not limit the implementation of the herein described systems and methods in computing environments having differing components and configurations. That is, the inventive concepts described herein may be implemented in various computing environments using various components and configurations.

Those of skill in the art will appreciate that the herein described apparatuses, engines, devices, systems, and methods are susceptible to various modifications and alternative constructions. There is no intention to limit the scope of the invention to the specific constructions described herein. Rather, the herein described systems and methods are intended to cover all modifications, alternative constructions, and equivalents falling within the scope and spirit of the disclosure, any appended claims and any equivalents thereto.

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

We claim:

1. A robotic system, comprising:

at least one robotic device, the at least one robotic device comprising a latch mechanism and an adaptor configured to receive a payload, the latch mechanism configured to hold the payload in the adaptor;

a controller configured to receive a user input; and at least one computing device communicatively coupled to the at least one robotic device, the at least one computing device configured to:

issue one or more commands to the at least one robotic device based on a user input via the controller, the one or more first commands causing the robotic device to release the latch mechanism and release the payload from the adaptor;

wherein the latch mechanism comprises at least one latch, at least one latch receptacle configured to receive the at least one latch, and a latch release mechanism configured to release the at least one latch from the at least one latch receptacle; and wherein the at least one robotic device further comprises at least one compression spring and an ejector plate located between the at least one compression spring and the adaptor.

2. The robotic system of claim 1, wherein the controller comprises a joystick and/or one or more buttons.

3. The robotic system of claim 1, wherein the at least one robotic device comprises an unmanned ground vehicle, an unmanned aerial device, or a spherical robot.

4. The robotic system of claim 1, wherein the one or more first commands cause the latch release mechanism to release the at least one latch from the at least one latch receptable, thereby causing the at least one compression spring to eject the ejector plate and the adaptor.

5. The robotic system of claim 1, wherein the at least one robotic device is communicatively coupled to the at least one computing device via a wireless connection.

6. The robotic system of claim 1, wherein the at least one robotic device is configured to receive a plurality of adaptors configured for different payload profiles.

7. The robotic system of claim 1, further comprising a safety hole configured to receive a safety pin, wherein the latch mechanism is unable to release if the safety pin is located within the safety hole.

8. The robotic system of claim 1, wherein the at least one robotic device comprises at least one linear actuator configured to move the latch mechanism from a first position to a second position in response to the one or more first commands.

9. The robotic system of claim 1, wherein the computing device is configured to attach to a garment worn by an operator of robotic system.

10. The robotic system of claim 1, wherein the at least one robotic device is an unmanned ground vehicle comprising one or more wheels or an unmanned aerial device.

11. The robotic system of claim 1, further comprising a display, wherein the at least one robotic device further comprises at least one camera, wherein the display is remote from the at least one robotic device and is configured to display video, images, and/or audio captured by the at least one camera of the at least one robotic device.

12. The robotic system of claim 11, wherein the display is configured to attach to a garment worn by an operator of robotic system.

13. The robotic system of claim 11, wherein the display comprises a mobile device.

14. The robotic system of claim 11, wherein the at least one camera comprises a 180-degree view camera.

15. The robotic system of claim 1, wherein the at least one robotic device is communicatively coupled to the at least one computing device via a wired connection.

16. The robotic system of claim 15, further comprising a cable reel configured to attach to a garment worn by an operator of the robotic system and manage the wired connection between the at least one computing device and the at least one robotic device.

17. A robotic system, comprising:

at least one robotic device, the at least one robotic device comprising a latch mechanism and an adaptor configured to receive a payload, the latch mechanism configured to hold the payload in the adaptor;

a controller configured to receive a user input;

at least one computing device communicatively coupled to the at least one robotic device, the at least one computing device configured to:

issue one or more commands to the at least one robotic device based on a user input via the controller, the one or more first commands causing the robotic device to release the latch mechanism and release the payload from the adaptor;

a safety hole configured to receive a safety pin, wherein the latch mechanism is unable to release if the safety pin is located within the safety hole; and a safety hole configured to receive a solenoid shaft, wherein the latch mechanism is unable to release if the solenoid shaft is located within the safety hole.

18. A robotic system, comprising:

at least one robotic device, the at least one robotic device comprising a latch mechanism and an adaptor configured to receive a payload, the latch mechanism configured to hold the payload in the adaptor;

a controller configured to receive a user input;

at least one computing device communicatively coupled to the at least one robotic device, the at least one computing device configured to:

issue one or more commands to the at least one robotic device based on a user input via the controller, the one or more first commands causing the robotic device to release the latch mechanism and release the payload from the adaptor;

wherein the at least one robotic device comprises at least one linear actuator configured to move the latch mechanism from a first position to a second position in response to the one or more first commands; and wherein the least one linear actuator is configured to push against at least one compression spring when the linear actuator is in the second position, wherein the at least one compression spring holds the latching mechanism in a locked position when the at least one linear actuator is in the first position.

* * * * *